(12) United States Patent
Guo et al.

(10) Patent No.: US 11,037,031 B2
(45) Date of Patent: Jun. 15, 2021

(54) IMAGE RECOGNITION METHOD, ELECTRONIC APPARATUS AND READABLE STORAGE MEDIUM

(71) Applicant: Beijing Horizon Robotics Technology Research and Development Co., Ltd., Beijing (CN)

(72) Inventors: Chaoxu Guo, Beijing (CN); Qian Zhang, Beijing (CN); Guoli Wang, Beijing (CN); Chang Huang, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 16 days.

(21) Appl. No.: 16/788,661

(22) Filed: Feb. 12, 2020

(65) Prior Publication Data

US 2020/0285911 A1 Sep. 10, 2020

(30) Foreign Application Priority Data

Mar. 6, 2019 (CN) .......................... 201910168505.1

(51) Int. Cl.
*G06K 9/62* (2006.01)
*G06N 3/04* (2006.01)

(52) U.S. Cl.
CPC ......... *G06K 9/6267* (2013.01); *G06K 9/6256* (2013.01); *G06N 3/04* (2013.01); *G06T 2207/20084* (2013.01); *G06T 2207/20221* (2013.01)

(58) Field of Classification Search
CPC .. G06K 9/6267; G06K 9/6256; G06K 9/6202; G06K 9/036; G06K 9/4628; G06K 9/629; G06K 9/00751; G06K 9/6215; G06K 9/00744; G06K 9/627; G06K 9/3233; G06K 9/6232; G06K 9/6271; G06K 9/00664; G06K 9/6277; G06K 9/00791; G06K 9/46; G06K 9/4671; G06K 9/00624; G06K 9/00805; G06K 2009/4695; G06N 3/04; G06N 3/0454; G06N 3/08; G06N 3/084; G06N 3/0481; G06N 3/02; G06N 3/0445; G06T 2207/20221; G06T 2207/20081–20084; G06T 2207/10016; G06T 2207/10024; G06T 7/33; G06T 7/11; G06T 7/0002; G06T 7/174; G06T 7/50
See application file for complete search history.

(56) References Cited

U.S. PATENT DOCUMENTS

9,213,899 B2 * 12/2015 Mj .......................... G06T 11/60
9,349,066 B2 *  5/2016 Koo .................... G06K 9/00664
10,242,289 B2 *  3/2019 Cricri ................... G06K 9/4628
(Continued)

*Primary Examiner* — Michael S Osinski
(74) *Attorney, Agent, or Firm* — Westbridge IP LLC (57) ABSTRACT

An image recognition method includes: determining a first feature map of the current frame image by using a convolutional neural network based on a type of a current frame image; determining a second feature map of a key frame image before the current frame image; performing feature alignment on the first feature map and the second feature map to obtain a first aligned feature map; fusing the first feature map and the first aligned feature map to obtain a first fused feature map; and recognizing content in the current frame image based on the first fused feature map.

20 Claims, 8 Drawing Sheets

(56) References Cited

U.S. PATENT DOCUMENTS

| | | | | |
|---|---|---|---|---|
| 10,452,959 B1* | 10/2019 | Gautam | | G06K 9/6271 |
| 10,452,980 B1* | 10/2019 | Kim | | G06K 9/627 |
| 10,504,027 B1* | 12/2019 | Kim | | G06K 9/78 |
| 10,671,855 B2* | 6/2020 | Lee | | G06K 9/00765 |
| 10,762,662 B2* | 9/2020 | Chalamala | | G06K 9/6232 |
| 10,769,485 B2* | 9/2020 | Yang | | G06T 1/00 |
| 10,796,184 B2* | 10/2020 | Senay | | G06N 3/04 |
| 10,799,182 B2* | 10/2020 | McDuff | | G06N 3/0454 |
| 10,885,682 B2* | 1/2021 | Zang | | G01C 21/30 |
| 2012/0262543 A1* | 10/2012 | Lee | | G06T 7/97 |
| | | | | 348/43 |
| 2013/0057644 A1* | 3/2013 | Stefanoski | | H04N 13/111 |
| | | | | 348/42 |
| 2013/0208975 A1* | 8/2013 | Hsu | | G06T 7/593 |
| | | | | 382/154 |
| 2015/0054824 A1* | 2/2015 | Jiang | | G06K 9/6284 |
| | | | | 345/420 |
| 2016/0350930 A1* | 12/2016 | Lin | | G06K 9/66 |
| 2018/0211130 A1* | 7/2018 | Jiang | | G06K 9/6273 |
| 2019/0130574 A1* | 5/2019 | Li | | G06T 7/11 |
| 2019/0156144 A1* | 5/2019 | Li | | G06K 9/3233 |
| 2019/0164290 A1* | 5/2019 | Wang | | G06K 9/00973 |
| 2019/0244358 A1* | 8/2019 | Shi | | G06K 9/4604 |
| 2019/0251694 A1* | 8/2019 | Han | | G06N 3/08 |
| 2019/0385024 A1* | 12/2019 | Croxford | | G06N 3/0454 |
| 2020/0026956 A1* | 1/2020 | Kumar | | G06K 9/3233 |
| 2020/0034962 A1* | 1/2020 | Mathew | | G06K 9/6271 |
| 2020/0089990 A1* | 3/2020 | Xu | | G06T 7/11 |
| 2020/0126187 A1* | 4/2020 | Park | | H04N 19/463 |
| 2020/0193623 A1* | 6/2020 | Liu | | G06T 7/50 |
| 2020/0210773 A1* | 7/2020 | Li | | G06K 9/6257 |
| 2020/0250497 A1* | 8/2020 | Peng | | G06K 9/6277 |
| 2020/0311943 A1* | 10/2020 | Dai | | G06N 3/04 |
| 2020/0327409 A1* | 10/2020 | Kim | | G06N 3/0454 |
| 2020/0357109 A1* | 11/2020 | Wen | | G06N 3/08 |
| 2020/0364478 A1* | 11/2020 | Zhang | | G06K 9/629 |
| 2020/0372648 A1* | 11/2020 | Zhang | | G06T 1/20 |
| 2020/0410273 A1* | 12/2020 | Miao | | G06K 9/4671 |
| 2021/0034913 A1* | 2/2021 | Pan | | G06K 9/6232 |
| 2021/0035304 A1* | 2/2021 | Jie | | G06K 9/6232 |
| 2021/0056344 A1* | 2/2021 | Zhang | | G06N 3/0454 |
| 2021/0081681 A1* | 3/2021 | Chiba | | G06K 9/6271 |

\* cited by examiner

IMAGE RECOGNITION METHOD, ELECTRONIC APPARATUS AND READABLE STORAGE MEDIUM

CROSS-REFERENCE TO RELATED APPLICATIONS

This application claims priority to Chinese Patent Application Serial No. 201910168505.1, filed on Mar. 6, 2019, the entire contents of which are incorporated herein by reference for all purposes.

TECHNICAL FIELD

The present application relates to the field of image processing technologies, in particular to an image recognition method, an electronic apparatus and a readable storage medium.

BACKGROUND

Improvements to existing image detection and segmentation technologies are based on image levels. How to efficiently solve video-based detection and segmentation is still a challenging problem.

SUMMARY

Embodiments of the present application provide an image recognition method, an electronic apparatus and a readable storage medium.

In accordance with a first aspect of the present application, an image recognition method is provided, including: determining a type of a current frame image; determining a first feature map of the current frame image used to participate in feature alignment and fusion by using a convolutional neural network based on the type of the current frame image; determining a second feature map of a key frame image before the current frame image; performing feature alignment on the first feature map and the second feature map to obtain a first aligned feature map; fusing the first feature map and the first aligned feature map to obtain a first fused feature map; and recognizing content in the current frame image based on the first fused feature map.

In accordance with a second aspect of the present application, a computer readable storage medium is provided. The computer readable storage medium stores a computer program, and when the computer program is executed by a processor, the image recognition method descried above is implemented.

In accordance with a third aspect of embodiments of this specification, an electronic apparatus is also provided, including a memory, a processor, and a computer program that is stored on the memory and able to run on the processor. When the computer program is executed by the processor, the image recognition method descried above is implemented.

In the technical solutions of the present application, the feature alignment is performed on the current frame image and the key frame image before the current frame image, features obtained after the feature alignment and features of the current frame image are fused, and the content in the current frame image is recognized by using a fused feature. Since the image recognition may be performed by fusing features of the current frame image on the basis of the feature alignment, so that number of features for the image recognition is increased, improving the accuracy of the image recognition.

BRIEF DESCRIPTION OF DRAWINGS

The above and other objectives, features and advantages of the present application will become more apparent from the more detailed description of the embodiments of the present application taken with reference to the accompanying drawings. The accompanying drawings are used to provide further understanding of the embodiments of the present application, and constitute a part of this specification and explain the present application together with the embodiments of the present application, rather than limiting the present application. Throughout the accompanying drawings, the same reference numerals generally represent the same part or step.

DETAILED DESCRIPTION OF THE EMBODIMENTS

Hereinafter, exemplary embodiments in accordance with the present application will be described below in detail with reference to the accompanying drawings. Apparently, the embodiments to be described are merely some but not all of the embodiments of the present application. It should be understood that the present application is not limited to the exemplary embodiments to be described herein.

Overview

How to efficiently solve video-based detection and segmentation is still a challenging problem due to two reasons. First, an image-based detection and segmentation model generally requires a large amount of computation and parameters, so a huge amount of computation may be caused by directly applying the image-based detection and segmentation model to a video frame by frame; and second, motion blur, out of focus and rare posture may occur to objects in the video.

In order to solve the above problems, generally, some key frames which are sparse are selected from the video, and the remaining frames are used as non-key frames. Then, features are extracted only on the basis of the key frames, and for the non-key frames, features of neighboring key frames are mapped and aligned as features of the non-key frames by using an optical flow output from an optical flow network. Since the amount of computation of the optical flow network is less than that of a whole feature extraction network, the amount of computation can be effectively reduced and the accuracy of image processing can be improved.

However, the optical flow network is used to capture corresponding points of pixels between two images and then output a corresponding offset, so it is difficult to find a spatial correspondence and offset of two high-level features when the optical flow network is directly applied to feature levels with more abstract semantic information. Consequently, the accuracy of image recognition is reduced.

As described above, in a video detection method, a target object is to be detected from video frames. Since the video stream is usually continuous, how to utilize information, such as timing sequence, context, and the like, of the target object in the video is a key to improve target detection performance of the video.

In view of the above technical problems, the basic concept of the present application is that feature alignment is performed on a current frame image and a key frame image before the current frame image, then features obtained after the feature alignment and features of the current frame image are fused, and content in the current frame image is recognized by using a fused feature.

Furthermore, since the image recognition may be performed by fusing the features of the current frame image on the basis of the feature alignment, the number of features for the image recognition can be increased, so that the accuracy of image recognition can be improved when the image recognition is performed on the basis of increasing the number of features.

After the basic principle of the present application has been introduced, various non-limiting embodiments of the present application will be specifically described below with reference to the accompanying drawings.

Exemplary Method

Figure 1:
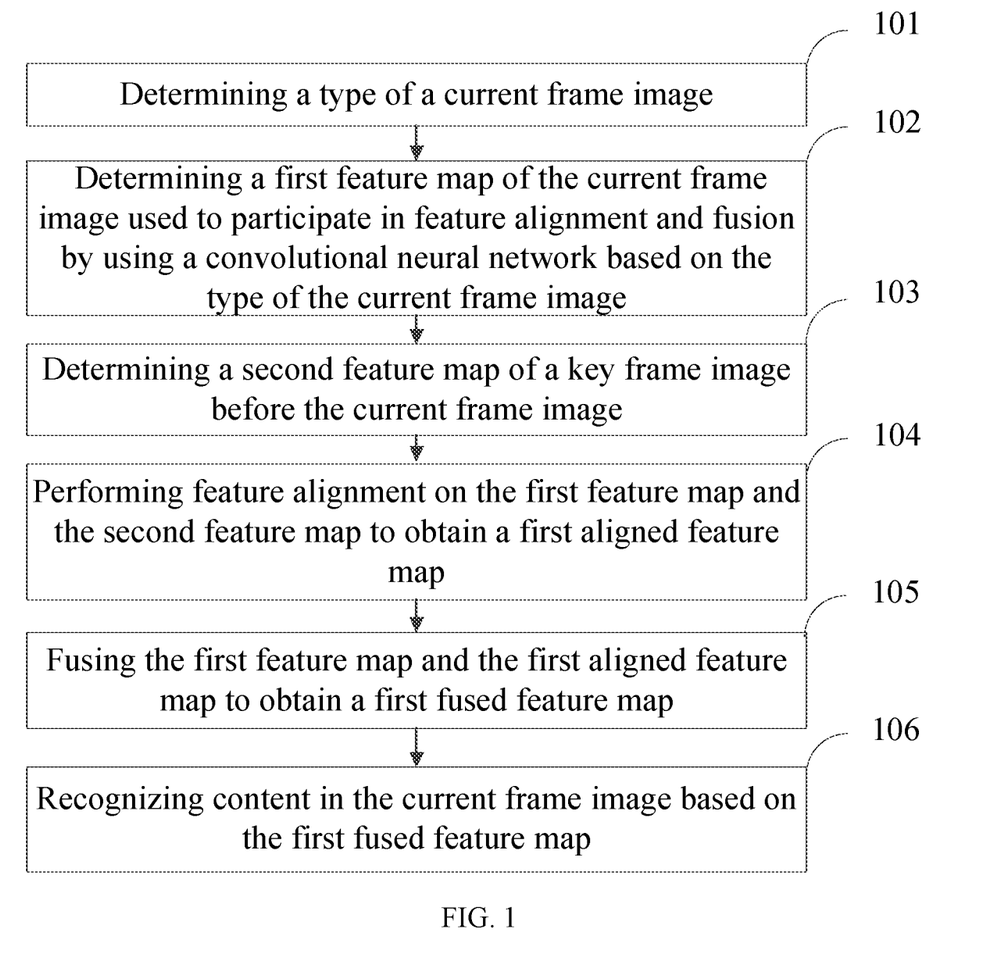
FIG. 1 is a schematic flowchart of an image recognition method according to an exemplary embodiment of the present application.

FIG. 1 is a schematic flowchart of an image recognition method according to an exemplary embodiment of the present application. The method in this embodiment is applicable to an electronic apparatus. As shown in FIG. 1, the method includes the following steps.

Step 101: determining a type of a current frame image.

The type of the current frame image may be a key frame in a video, or may be a non-key frame in the video.

Specifically, if a point in time corresponding to the current frame image is within a first preset time period, the type of the current frame image is determined based on a first key frame setting condition corresponding to the first preset time period. The first preset time period may be rush hour, i.e., 7:30 to 10:00 and 18:30 to 21:30, or a daytime period of 7:00 to 19:00. The first key frame setting condition may be that one frame per m frames is a key frame, where m is an integer greater than 1. For example, one frame per 2 frames is a key frame.

Specifically, if the point in time corresponding to the current frame image is within a second preset time period, the type of the current frame image is determined based on a second key frame setting condition corresponding to the second preset time period. The second preset time period is set according to the first preset time period. If the first preset time period is the rush hour, the second preset time period is non-rush hour, i.e., 10:00 to 18:30 and 21:30 to 7:30; and if the first preset time period is a daytime period, the second preset time period is a time period at night, i.e., 19:00 to 7:00. The second key frame setting condition may be that one frame per n frames is the key frame, where n is an integer greater than m. For example, one frame per 10 frames is a key frame.

Thus, the key frame setting condition is adjusted according to different time periods, so that acquisition of the key frames is better matched with the actual situation.

Hereinafter, a case where the type of the current frame image is the key frame and a case where the type of the current frame image is the non-key frame will be described hereinafter in detail, respectively.

Step 102: determining a first feature map of the current frame image used to participate in feature alignment and fusion by using a convolutional neural network based on the type of the current frame image.

As described above, the type of the current fame image may be the key frame or the non-key frame. When the current frame image is the key frame, it is indicated that features of the current frame image are important, so it is necessary to extract a low-level feature and a high-level feature of the current frame image by using a neural network. Here, the low-level feature of the current frame image refers to a feature extracted by using a convolutional layer with lower number of layers when the feature is extracted by using the neural network, for example, the feature extracted by using the first layer to the tenth layer in the neural network with 50 layers; and the high-level feature of the current frame image refers to a feature obtained by extracting the low-level feature by using a convolutional layer with higher number of layers when the feature is extracted by using the neural network, for example, the feature obtained by extracting the feature, extracted by using the first layer to the tenth layer, by using the thirtieth layer to the fiftieth layer in the neural network with 50 layers. Correspondingly, when the current frame image is the non-key frame, the low-level feature of the current frame image is extracted by using the neural network, that is, when the feature is extracted by using the neural network, the feature is extracted by using the convolutional layer with the lower number of layers.

Step 103: determining a second feature map of a key frame image before the current frame image.

The second feature map of the key frame image before the current frame image may be calculated by implementing the steps 101 to 105 in this embodiment, and then cached in a storage unit. The second feature map may be directly read from a cache. If the second feature map is released in the cache, it is required to re-extract the low-level feature and high-level feature of the key frame image before the current frame image by using the neural network.

Since there are still key frame images before the current frame image, it may be known that the current frame image is not a first frame image in this embodiment of the present application. In the method of this embodiment of the preset application, when the first frame image is determined, the first frame image is used as the key frame image, feature extraction is performed on the first frame image by using all convolutional layers in the convolutional neural network, and the extracted feature map is used to recognize content in the first frame image. As for subsequent frame images following the first frame image, the subsequent frame images may be recognized by the method provided in this embodiment of the present application.

Step 104: performing the feature alignment on the first feature map and the second feature map to obtain a first aligned feature map.

Figure 2:
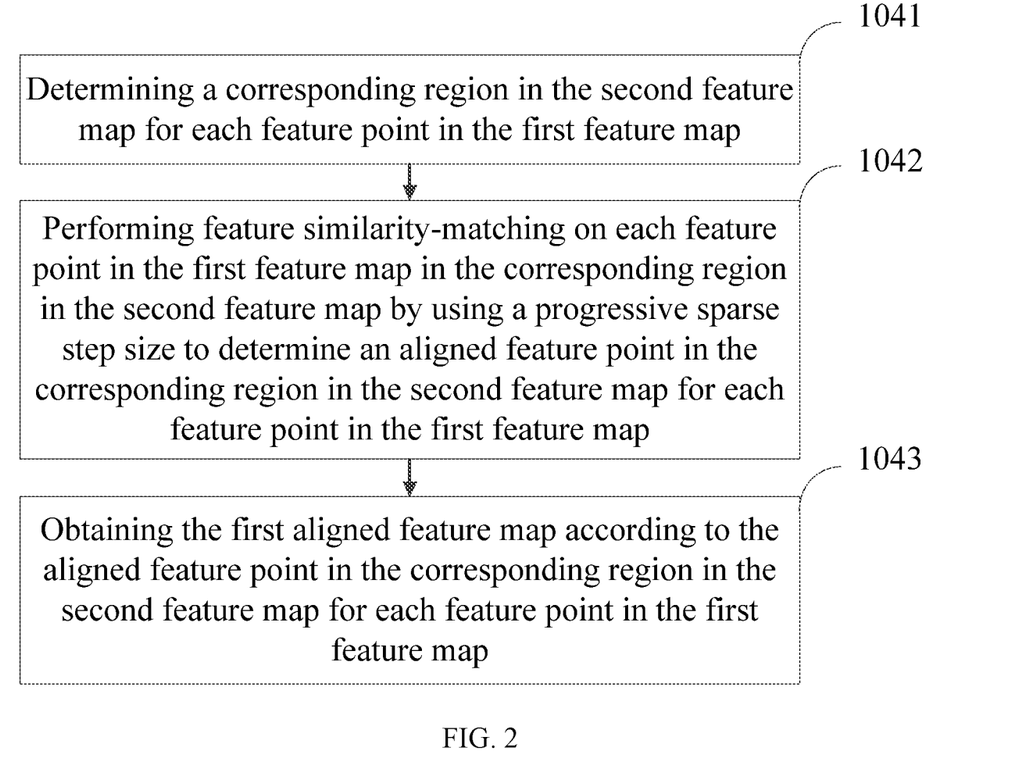
FIG. 2 is a schematic diagram for performing feature alignment on the first feature map and the second feature map by using a progressive sparse attention model according to another exemplary embodiment of the present application.

How to perform the feature alignment on the first feature map and the second feature map may refer to the description of the embodiment in FIG. 2 and will not be described here in detail.

Step 105: fusing the first feature map and the first aligned feature map to obtain a first fused feature map.

If the current frame image is a key frame image, the first aligned feature map and a feature map for fusing the key frame image are fused by weighting to obtain the first fused feature map.

Step 106: recognizing content in the current frame image based on the first fused feature map.

After the first fused feature map is obtained, the image recognition is performed by using the first fused feature map, so that the content in the current frame image may be recognized.

In this embodiment, the feature alignment is performed on the current frame image and a key frame image before the current frame image, fusion is performed on the feature obtained after the feature alignment and the feature of the current frame image, and the content in the current frame image is recognized by using the fused feature. Since the image recognition is performed by fusing the feature of the current frame image on the basis of the feature alignment, so that number of features for the image recognition is increased, thereby improving the accuracy of the image recognition.

In this embodiment of the present application, when the feature alignment is performed on the first feature map and the second feature map, specifically, a progressive sparse local attention model may be used to perform the feature alignment on the first feature map and the second feature map. The progressive sparse local attention model is specifically configured to input a feature map of the key frame image before the current frame image and a feature map of the current frame image; then for each feature point in the feature map of the current frame image, automatically search for feature points which are most similar in a local region of the feature map of the key frame image before the current frame image in a progressive sparse manner, and calculate similarity weights; and finally, weight these feature points according to the similarity weights to obtain a new aligned feature map.

Specifically, when the feature alignment is performed on the first feature map and the second feature map by using the progressive sparse local attention model, the feature alignment may be performed on each feature point in the first feature map in a corresponding region in the second feature map to obtain the first aligned feature map. The progressive sparse local attention model may be used to perform the feature alignment on the first feature map and the second feature map.

Specifically, when the feature alignment is performed on the first feature map and the second feature map by using the progressive sparse local attention model, as shown in FIG. 2, the step 104 specifically includes the following steps.

Step 1041: determining a corresponding region in the second feature map for each feature point in the first feature map.

Step 1042: performing feature similarity-matching on each feature point in the first feature map in the corresponding region in the second feature map by using a progressive sparse step size to determine an aligned feature point in the corresponding region in the second feature map for each feature point in the first feature map.

Step 1043: obtaining the first aligned feature map according to the aligned feature point in the corresponding region in the second feature map for each feature point in the first feature map.

Figure 3:
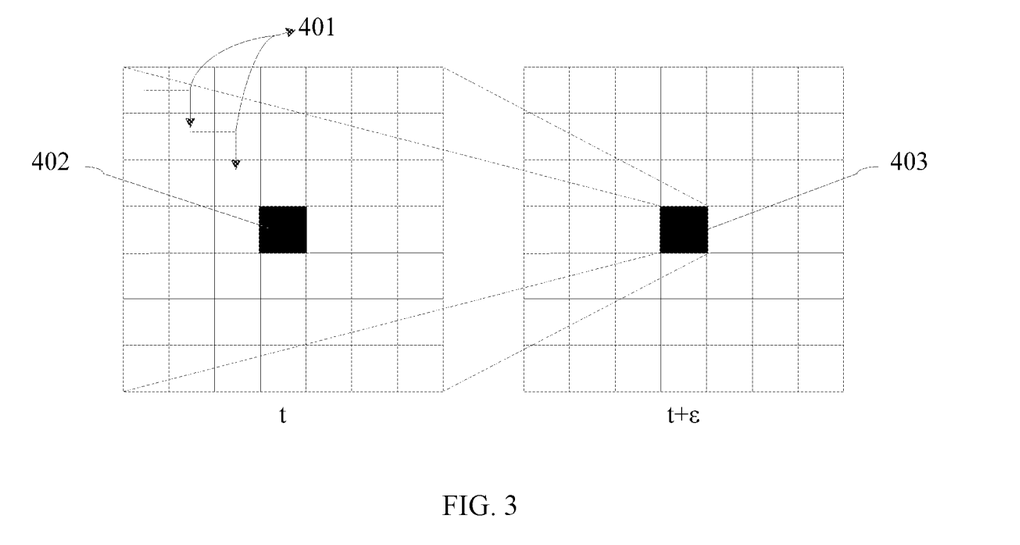
FIG. 3 is a schematic structural diagram of a local region for feature alignment according to another exemplary embodiment of the present application.

For example, FIG. 3 shows a specific operation for performing feature alignment in a local region. A feature map corresponding to the current frame image which is the $(t+\varepsilon)^{th}$ frame in a video stream is shown on the right; and the feature map corresponding to a previous key frame before the current frame image, which is the $t^{th}$ frame in the video stream, is shown on the left. When features of the $t^{th}$ frame is to be aligned to those of $(t+\varepsilon)^{th}$ frame, as for each feature point in the feature map of the $(t+\varepsilon)^{th}$ frame, an alignment operation is performed in a local region at a corresponding position in the feature map of the $t^{th}$ frame.

Specifically, weights of feature similarity to surrounding feature points are calculated in the local region by using an asymptotically sparse step size 401, and corresponding feature points are further weighted according to the weights to obtain a feature value of a feature point in the aligned feature map of the $(t+\varepsilon)^{th}$ frame. In this way, a feature point 403 in the feature map of the $(t+\varepsilon)^{th}$ frame may be aligned to a feature point 402 in the feature map of the $t^{th}$ frame. In a similar way, the alignment operation is performed on each feature point in the feature map of the $(t+\varepsilon)^{th}$ frame in the local region at a corresponding position in the feature map of the $t^{th}$ frame, thereby obtaining the aligned feature map.

Continuously referring to FIG. 3, the feature map of the $t^{th}$ frame is represented by xt, the feature map of the $(t+\varepsilon)^{th}$ frame is represented by xt+ε, and corresponding embedded features are respectively represented by f(xt) and g(xt+ε). In the PSLA, each of surrounding pixels of the f(xt) within a limited range is compared with the g(xt+ε), the comparison result obtained is normalized and then used to correct the xt, and finally, a corrected feature is propagated to the feature map of the $(t+\varepsilon)^{th}$ frame.

Specifically, operations of the PSLA may include two steps. As for two positions of i and j, the comparison between the two positions of i and j is defined as:

$$c_{ij} = \langle g(x_{i+p}^{t+\varepsilon}), f(x_{j+p}^{t}) \rangle \quad \text{Formula (1)}$$

Next, a range of j is to be limited when a weight $c_{ij}$ is calculated. As for each position i, the comparison is only performed in a constraint neighborhood $\Phi(i)$. The constraint neighborhood $\Phi(i)$ becomes progressive sparse at a maximum displacement d, and the $\Phi(i)$ may be divided into a series of sub-regions, specifically as shown in formula (2):

$$\Phi(i) = \{\Phi_0(i), \Phi_1(i), \Phi_2(i), \ldots, \Phi_d(i)\} \quad \text{Formula (2)}$$

Here:

$$\Phi_0(i) = i,$$

$$\Phi_k(i) = \Delta(k) \backslash \Phi_0(i),$$

$$\Delta_i(k) = [-k:k:k] * [-k:k:k] + i, \ k \leq d \quad \text{Formula (3)}$$

Here, $\Delta_i(k)$ in the formula (3) represents positions of different sub-regions centered on i, which ranges from −k to +k in steps of k in horizontal and vertical directions. $\Phi_k(i)$ represents a sub-region other than $\Phi_0(i)$.

Specifically, the second step is to correct and align the feature $x^t$ by using the weight $c_{ij}$, expressed by:

$$y_i = \frac{1}{C(i)} \sum_{j \in \phi(i)} c_{ij} x_j^t \qquad \text{Formula (4)}$$

Here, $y_i$ is the feature representation after correcting, and C(i) is a factor for weight normalization. Finally, the aligned feature $y_i$ is propagated to the feature map of the $(t+\varepsilon)^{th}$ frame.

In this way, by using the PSLA, the feature similarity-matching is performed on each feature point in the first feature map in the corresponding region in the second feature map by using a progressive sparse step size to determine an aligned feature point in the corresponding region in the second feature map for each feature point in the first feature map, so that the feature points in the second feature map are propagated to the first feature map. The second feature map carries a high-level feature which has significance, so that the feature alignment is performed on the high-level feature when the feature alignment is performed on the first feature map and the second feature map. Because the high-level feature has a characteristic of significance, the accuracy of the feature alignment can be ensured, and the accuracy of subsequent feature recognition may also be improved on the basis of improving the accuracy of the feature alignment.

Figure 4:
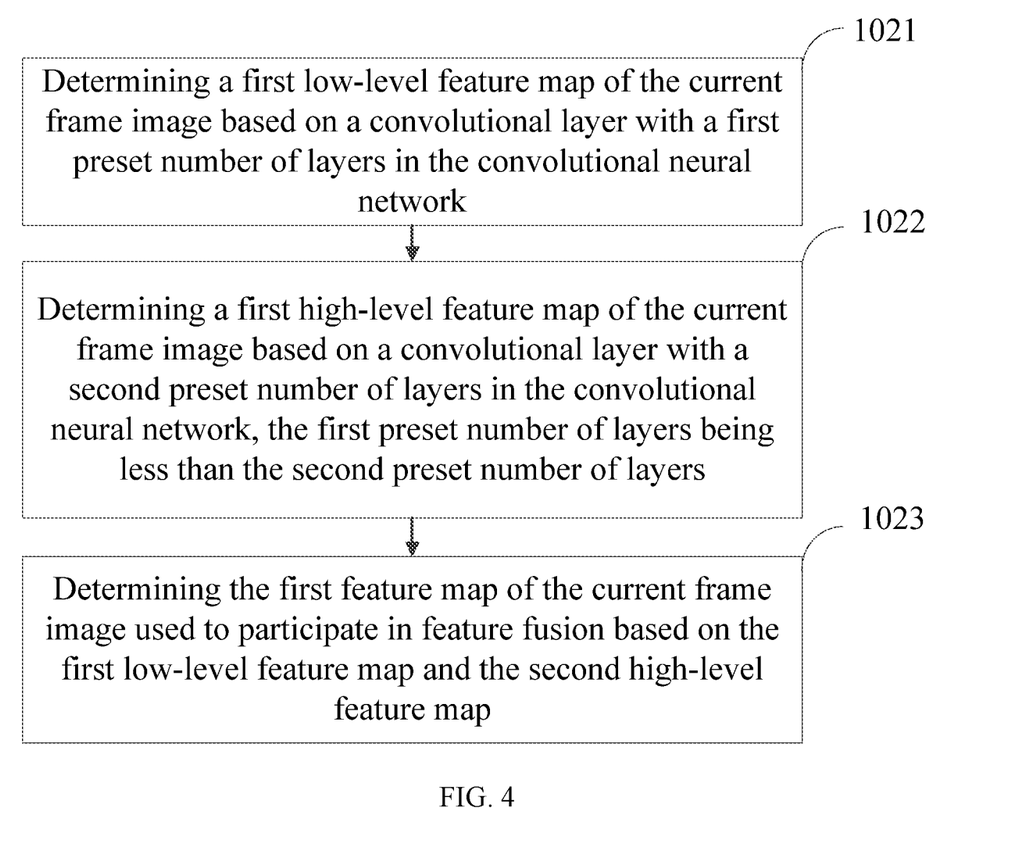
FIG. 4 is a schematic diagram for determining a first feature map when the current frame image is a key frame image according to another exemplary embodiment of the present application.

If the current frame image is a key frame image, the step 102 includes the following steps, as shown in FIG. 4.

Step 1021: determining a first low-level feature map of the current frame image based on a convolutional layer with a first preset number of layers in the convolutional neural network.

Step 1022: determining a first high-level feature map of the current frame image based on a convolutional layer with a second preset number of layers in the convolutional neural network, the first preset number of layers being less than the second preset number of layers.

Step 1023: determining the first feature map of the current frame image used to participate in feature fusion by using the first low-level feature map and the second high-level feature map.

Specifically, when the current frame image is determined as the key frame image, feature extraction is performed on the current frame image based on the convolutional layer with the first preset number of layers to determine the first low-level feature map; then, the feature extraction is performed on the first low-level feature map by using the convolutional layer with the second preset number of layers to determine the first high-level feature map; and the first low-level feature map and the first high-level feature map are fused to obtain the first feature map. It is also possible that the first low-level feature map and the first high-level feature map are directly used as the first feature map.

In this embodiment of the specification, the first preset number of layers and the second preset number of layers may be determined according to a threshold. All convolutional layers, the layer numbers of which is less than the threshold, in the convolutional neural network are regarded as the first preset number of layers, and all convolutional layers, the layer numbers of which is not less than or is greater than the threshold, in the convolutional neural network are regarded as the second preset number of layers. If there are total 50 convolutional layers in the convolutional neural network and the threshold is set as 20, it may be determined that first to nineteenth layers are regarded as the first preset number of layers, and twentieth to fiftieth layers are regarded as the second preset number of layers. The feature extraction is performed on the current frame image by using the first to nineteenth convolutional layers to determine the first low-level feature map; the feature extraction is performed on the first low-level feature map by using the twentieth to fiftieth convolutional layers to determine the first high-level feature map; and after the first low-level feature map and the first high-level feature map are determined, the first low-level feature map and the first high-level feature map are used as the first feature map.

In this embodiment of the specification, when the current frame image is a non-key frame image, a feature extraction method is different from the feature extraction method described above and will be specifically described hereinafter.

If the current frame image is a key frame image, when the second feature map is determined by implementing the step 103, the second feature map of a previous key frame before the current frame image may be read from a cache. The second feature map is determined based on a second low-level feature map and a second high-level feature map of the previous key frame image before the current frame image as well as a third low-level feature map and a third high-level feature of a previous two key frame image before the current frame image.

Figure 5:
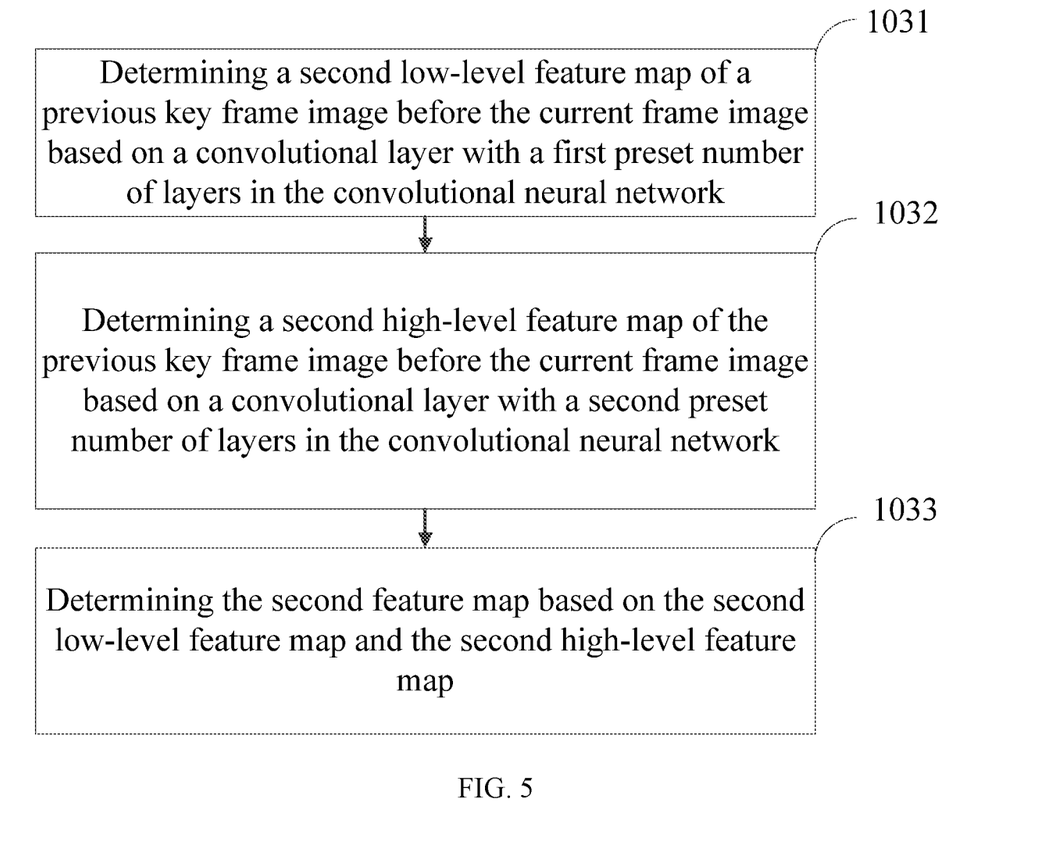
FIG. 5 is a schematic diagram for determining a second feature map when the current frame image is a key frame image according to another exemplary embodiment of the present application.

Specifically, the step of determining the second feature map has been executed before the acquisition of the current frame image. As shown in FIG. 5, following specific steps are included.

Step 1031: determining a second low-level feature map of a previous key frame image before the current frame image based on a convolutional layer with a first preset number of layers in the convolutional neural network.

Step 1032: determining a second high-level feature map of the previous key frame image before the current frame image based on a convolutional layer with a second preset number of layers in the convolutional neural network.

Step 1033: determining the second feature map based on the second low-level feature map and the second high-level feature map.

The steps 1031 to 1033 have been executed before the acquisition of the current frame image, and the result of execution (i.e., the second feature map) is cached. Thus, when the image recognition is performed on the current frame image, the second feature map is directly read from the cache.

Figure 6:
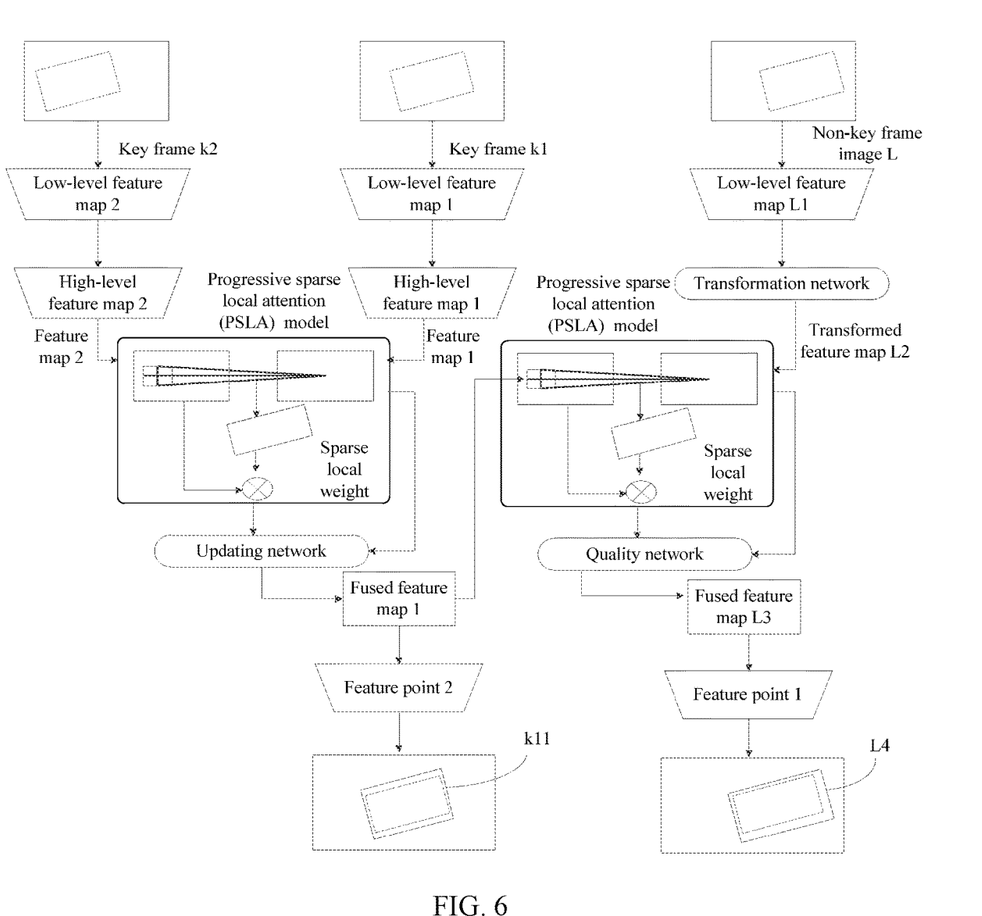
FIG. 6 is a schematic structural diagram for performing image recognition when the current frame image is a non-key frame image according to another exemplary embodiment of the present application.

As shown in FIG. 6, if the current frame image is a key frame k1, feature extraction is performed on the k1 by using the convolutional layer with the first preset number of layers to obtain a low-level feature map 1; the feature extraction is performed on the low-level feature map 1 by using the convolutional layer with the second preset number of layers to obtain a high-level feature map 1; and, the low-level feature map 1 and the high-level feature map 1 are fused to obtain a feature map 1. Correspondingly, a previous key frame image before the k1 is represented by k2. When the k2 is the current frame image, a feature map 2 may be extracted by the same feature extraction method as that for the k1, and then cached. It is only needed to read the feature map 2 from the cache. Subsequently, the feature map 1 and the feature map 2 are input into a progressive sparse local attention (PSLA) model for feature alignment, the first aligned feature map obtained by the feature alignment and the feature map 1 are fused by using an updating network to obtain a fused feature map 1 which is then cached, and all feature points 2 in the fused feature map 1 are acquired, and the content k11 in the k1 is recognized by using the feature points 2.

In this embodiment of the present application, when the current frame image is a key frame image, and after the first fused feature map is obtained, the first fused feature map may be cached. Thus, when the feature alignment is performed on features of images following the current frame, the first fused feature map which is cached may be directly read for the feature alignment, without obtaining the first fused feature map again, which reduces the amount of computation for feature extraction. Moreover, when the second high-level feature map is obtained, the feature extraction is directly performed on the first low-level feature map by using the convolutional layer with the second preset number of layers, instead of performing the feature extraction on the current frame image. Accordingly, the amount of computation for the feature extraction can be further reduced.

Furthermore, in this embodiment, when the current frame image is a key frame image, the second feature map of the previous key frame image before the current frame image is aligned to the first feature map of the current frame image. The second feature map contains the high-level feature of the previous key frame image and the first feature map contains the high-level feature of the current frame image, and the high-level feature has significance, so that the feature alignment is performed on the high-level feature when the feature alignment is performed on the first feature map and the second feature map. Because the high-level feature has a characteristic of significance, the accuracy of the feature alignment can be ensured, and the accuracy of subsequent feature recognition may also be improved on the basis of improving the accuracy of the feature alignment.

Figure 7:
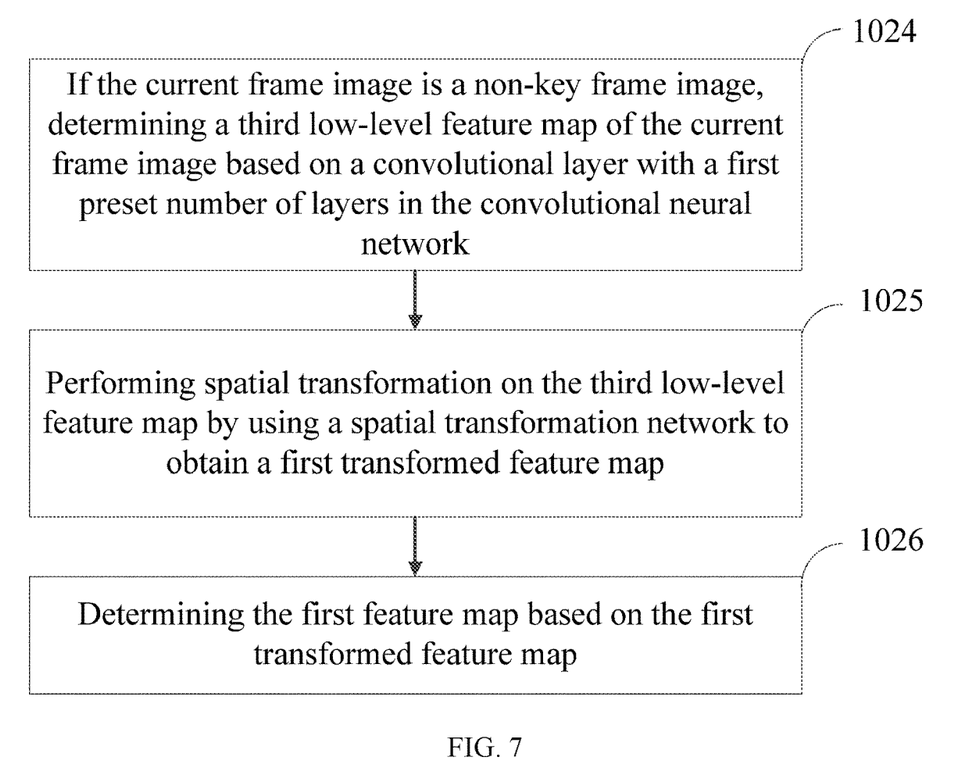
FIG. 7 is a schematic diagram for determining a first feature map when the current frame image is a non-key frame image according to another exemplary embodiment of the present application.

When the current frame image is a non-key frame image, the step 102 includes the following steps, as shown in FIG. 7.

Step 1024: if the current frame image is a non-key frame image, determining a third low-level feature map of the current frame image based on a convolutional layer with a first preset number of layers in the convolutional neural network.

The specific implementation may refer to the description of the step 1021 and will not be repeated here for the sake of simplicity.

In this embodiment, the feature extraction is performed on the non-key frame image by only the convolutional layer with the first preset number of layers, and the amount of computation for the feature extraction performed by the convolutional layer with the first preset number of layers is less than that for the feature extraction performed by the convolutional layer with the second preset number of layers. Thus, the amount of computation for the feature extraction performed on the non-key frame image can be effectively reduced, and the processing efficiency can be improved.

Step 1025: performing spatial transformation on the third low-level feature map by using a spatial transformation network to obtain a first transformed feature map.

Specifically, when the spatial transformation is performed by using the spatial transformation network, affine transformation is performed on the feature map of the non-key frame image, so that the first transformed feature map is obtained. Performing the spatial transformation on the third low-level feature map by using the spatial transformation network is used for enhancing vector representation of each feature point in the third low-level feature map.

Step 1026: determining the first feature map based on the first transformed feature map.

Specifically, the first transformed feature map may be directly used as the first feature map.

For example, taking the feature map of the non-key frame image as u1 for example, if an affine transformation coefficient is θ, it is possible to solve the u1 directly by the θ to obtain the first transformed feature map v1. It is also possible to solve the u1 by an inverse matrix of the θ to obtain the v1.

In this embodiment of the present application, if the current frame image is a non-key frame image, it is only needed to extract the low-level feature of the current frame image, and accordingly, the amount of computation for feature extraction can be reduced. Moreover, after the low-level feature of the current frame image is extracted, the spatial transformation is also performed on the low-level feature of the current frame image to enhance feature representation of the low-level feature of the current frame image. When the feature alignment is performed on the basis of enhancing the feature representation of the low-level feature, the accuracy of the feature alignment may be improved.

In this embodiment of the specification, if the current frame image is a non-key frame image, the second feature map of a previous key frame image before the current frame image may be read from the cache. The second feature map is determined based on a third feature map, used to participate in fusion, of the previous key frame image before the current frame image and a fourth feature map, used to participate in fusion, of a previous two key frame image before the current frame image.

Specifically, when the previous two key frame image before the current frame image is used as the current frame image, the fourth low-level feature map and the third high-level feature map of the previous two key frame image are obtained by executing the steps 1021 to 1023, and the fourth feature map is determined based on the fourth low-level feature map and the third high-level feature map and then cached. When the previous key frame image before the current frame image is used as the current frame image, also, a fifth low-level feature map and a fourth high-level feature map are obtained by executing the steps 1021 to 1023, and the third feature map is then determined based on the fifth low-level feature map and the fourth high-level feature map. In order to recognize the content in the previous key frame image, the fourth feature map is read from the cache, and the feature alignment is performed on the third feature map and the fourth feature map to obtain a second aligned feature map. Then, the third feature map and the second aligned feature map are fused to obtain a second fused feature map. Finally, the second feature map is determined based on the second fused feature map. After the second feature map is determined, the content in the previous key frame image is recognized by using the second feature map, and the second feature map is cached.

Thus, after the current frame image is acquired, the second feature map may be directly read from the cache.

In this embodiment of the specification, when the second feature map is determined based on the second fused feature map, the second fused feature map may be used as the second feature map.

As shown in FIG. 6, if the current frame image is a non-key frame image L, since a previous key frame image before the non-key frame image is k1, the fused feature map 1 of the k1 is read from the cache. The fused feature map 1 is used as the second feature map. The fused feature map 1 is obtained by fusing the feature map 1 and the first aligned feature map obtained by performing the feature alignment on the feature map 1 and the feature map 2 by using the PSLA.

In this embodiment of the specification, when the current frame image is a non-key frame image, the second feature map of the previous key frame image before the current frame image is aligned to the first feature map of the current frame image. The high-level features both in the previous key frame image and in the previous two key frame image are fused in the second feature map, and therefore, when the feature alignment is performed on the second feature map and the first feature map, the high-level features both in the previous key frame image and in the previous two key frame image are propagated to the current frame image. The high-level features have significance, and the first feature map contains the enhanced low-level features. Thus, when the feature alignment is performed on the basis of propagation of the high-level features and feature enhancement of the low-level features, the accuracy of the feature alignment may be further improved, and the accuracy of subsequent feature recognition may also be improved on the basis of further improving the accuracy of the feature alignment.

If the current frame image is a non-key frame image, after the first feature map and the second feature map are obtained by the above steps, the steps 104, 105 and 106 are sequentially executed. The implementation of the steps 104, 105 and 106 is the same as a process in which the current frame image is the key frame image, and will not be repeated here for the sake of simplicity.

For example, with reference to FIG. 6, if the current frame image is a non-key frame image L, feature extraction is performed on the k1 by using the convolutional layer with the first preset number of layers to obtain a low-level feature map L1; and spatial transformation is performed on the low-level feature map L1 by using the spatial transformation network to obtain a transformed feature map L2. Correspondingly, two previous key frame images before the L are determined as k1 and k2, and the cached fused feature map 1 is read from the cache.

Since the first feature map of the L is the transformed feature map L2, after the fused feature map 1 is read, the fused feature map 1 and the transformed feature map L2 are input into the PSLA for the feature alignment to obtain a first aligned feature map which is aligned, and the first aligned feature map and the transformed feature map L2 are fused by using a quality network to obtain a fused feature map L3, and all feature points 1 in the fused feature map L3 are acquired, and the content L4 in the L is recognized by using the feature points 1.

In this embodiment of the specification, the following technical solutions are employed: the first feature map is aligned to the second feature map; the first aligned feature map obtained after the feature alignment and the first feature map are then fused to obtain a first fused feature map of the non-key frame image; and finally, the content in the non-key frame image is recognized by using the first fused feature map.

Since the current frame image is the non-key frame image, the second feature map of the previous key frame image before the current frame image is aligned to the first feature map of the current frame image. The high-level features both in the previous key frame and the previous two key frame image are fused in the second feature map, and therefore, when the feature alignment is performed on the second feature map and the first feature map, the high-level features both in the previous key frame image and in the previous two key frame image are propagated to the current frame image. The high-level features have significance, and the first feature map contains the enhanced low-level features. Thus, when the feature alignment is performed on the basis of propagating the high-level features and enhancing the feature representation of the low-level features, the accuracy of the feature alignment may be further improved, and the accuracy of subsequent feature recognition may also be improved on the basis of further improving the accuracy of the feature alignment.

Additionally, since the high-level features are propagated based on spatial correspondence in the PSLA, with no parameters required, the number of parameters of the model can be effectively decreased. Thus, on the basis of the decreased number of parameters, the computation efficiency can be effectively improved, thereby further improving the processing speed.

Figure 8:
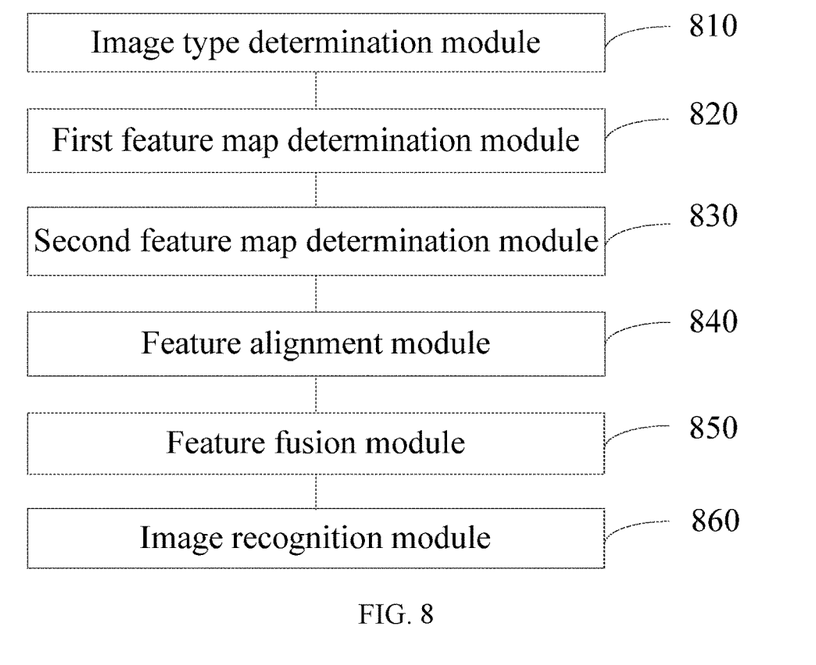
FIG. 8 is a block diagram of an image recognition device according to another exemplary embodiment of the present application.

Based on the same technical concept as the method, as shown in FIG. 8, an exemplary embodiment of the present application further provides an image recognition device, including: an image type determination module 810, configured to determine a type of a current frame image; a first feature map determination module 820, configured to determine a first feature map of the current frame image used to participate in feature alignment and fusion by using a convolutional neural network based on the type of the current frame image; a second feature map determination module 830, configured to determine a second feature map of a key frame image before the current frame image; a feature alignment module 840, configured to perform feature alignment on the first feature map and the second feature map to obtain a first aligned feature map; a feature fusion module 850, configured to fuse the first feature map and the first aligned feature map to obtain a first fused feature map; and an image recognition module 860, configured to recognize content in the current frame image based on the first fused feature map.

Figure 9:
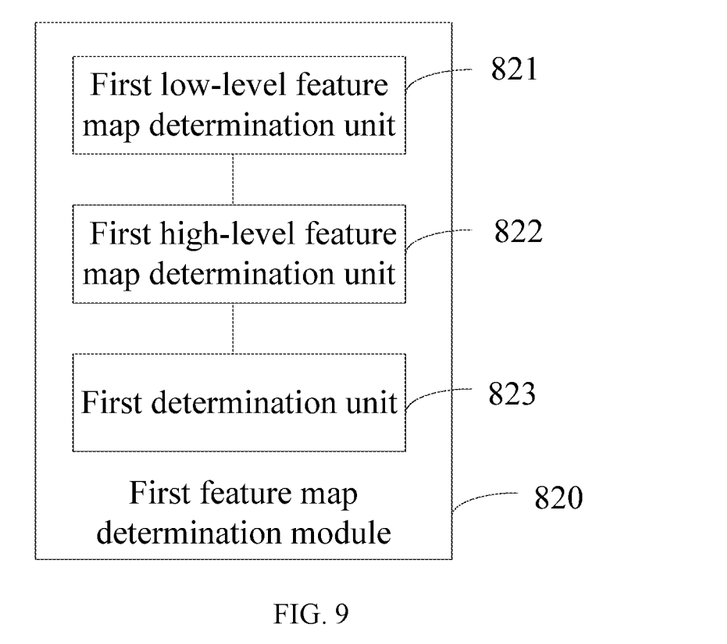
FIG. 9 is a first block diagram of a first feature map determination module according to another exemplary embodiment of the present application.

Alternatively, as shown in FIG. 9, the first feature map determination module 820 further includes: a first low-level feature map determination unit 821, configured to determine a first low-level feature map of the current frame image based on a convolutional layer with a first preset number of layers in the convolutional neural network when the current frame image is a key frame image; a first high-level feature map determination unit 822, configured to determine a first high-level feature map of the current frame image based on a convolutional layer with a second preset number of layers in the convolutional neural network, the first preset number of layers being less than the second preset number of layers; and a first determination unit 823, configured to determine a first feature map of the current frame image used to participate in feature fusion based on the first low-level feature map and the first high-level feature map.

Alternatively, the second feature map determination module 830 is specifically configured to read the second feature map of a previous key frame image before the current frame image from a cache when the current frame image is a key frame image. The second feature map is determined based on a second low-level feature map and a second high-level feature map of a previous key frame image before the current frame image.

Figure 10:
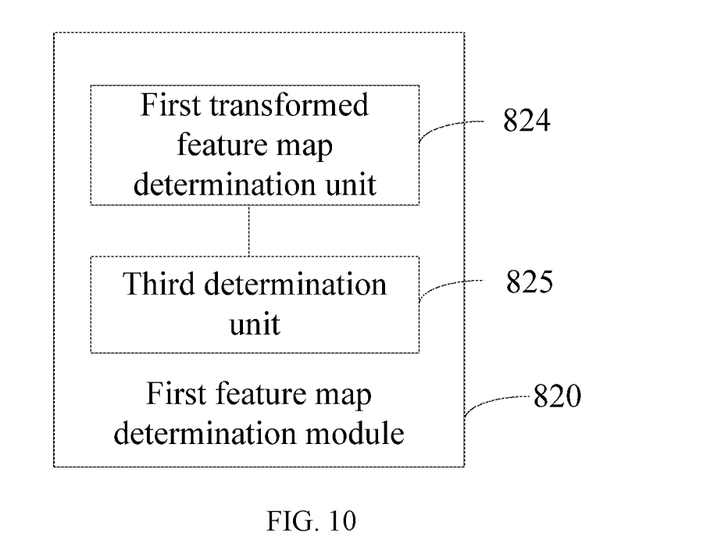
FIG. 10 is a second block diagram of a first feature map determination module according to another exemplary embodiment of the present application.

Alternatively, as shown in FIG. 10, the first feature map determination module 820 further includes: a first transformed feature map determination unit 824, configured to: when the current frame image is a non-key frame image, determine a third low-level feature map of the current frame image based on the convolutional layer with the first preset number of layers in the convolutional neural network, and perform spatial transformation on the third low-level feature map by using a spatial transformation network to obtain a first transformed feature map; and a third determination unit 825, configured to determine the first feature map based on the first transformed feature map.

Alternatively, the second feature map determination module 830 is specifically configured to read the second feature map of a previous key frame image before the current frame image from the cache when the current frame image is a non-key frame image. The second feature map is determined based on a third feature map of the previous key frame image before the current frame image used to participate in feature fusion and a fourth feature map of a previous two key frame image before the current frame image used to participate in feature fusion.

Alternatively, the feature alignment unit 835 is specifically configured to perform the feature alignment on each feature point in the first feature map in a corresponding region in the second feature map to obtain the first aligned feature map.

Alternatively, the feature alignment unit 835 is specifically configured to determine a corresponding region in the second feature map for each feature point in the first feature map; perform feature similarity-matching on each feature point of the first feature map in the corresponding region in the second feature map by using a progressive sparse step size to determine an aligned feature point in the corresponding region in the second feature map for each feature point in the first feature map; and obtain the first aligned feature map according to the aligned feature point in the corresponding region in the second feature map for each feature point in the first feature map.

Alternatively, the image type determination module 810 further includes: a first determination unit, configured to: if a point in time corresponding to the current frame image is within a first preset time period, determine the type of the current frame image based on a first key frame setting condition corresponding to the first preset time period; and a second determination unit, configured to: if the point in time corresponding to the current frame image is within a second preset time period, determine the type of the current frame image based on a second key frame setting condition corresponding to the second preset time period. The first preset time period is not overlapped with the second preset time period.

Figure 11:
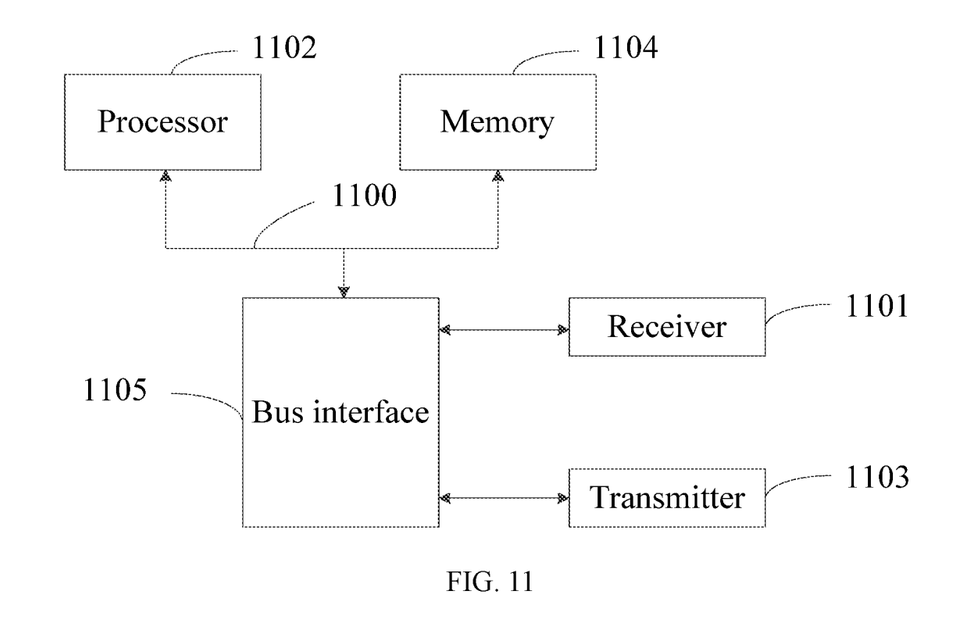
FIG. 11 is a structural diagram of an electronic apparatus according to an exemplary embodiment of the present application.

An exemplary embodiment of the present application further provides an electronic apparatus. As shown in FIG. 11, the electronic apparatus includes a memory 1104, a processor 1102, and a computer program that is stored in the memory 1104 and able to run on the processor 1102. The processor 1102 implements the steps in any one of the image recognition methods described above when the computer program is executed.

In FIG. 11, a bus architecture (represented by a bus 1100) is shown. The bus 1100 may include any number of interconnected buses and bridges. The bus 1100 links together various circuits including one or more processors represented by the processor 1102 and memories represented by the memory 1104. The bus 1100 may also link together various other circuits such as peripheral devices, voltage stabilizers and power management circuits, which are well-known and therefore will not be further described herein. A bus interface 1105 provides an interface between the bus 1100 and a receiver 1101 and an interface between the bus 1100 and a transmitter 1103. The receiver 1101 and the transmitter 1103 may be a same element, i.e., a transceiver, which provides a unit configured to communicate with various other devices over a transmission medium. The processor 1102 is responsible for managing the bus 1100 and normal processing, and the memory 1104 may be used to store data used by the processor 1102 to execute operations.

In addition to the methods and devices described above, the embodiments of the present application may also be a computer program product, including a computer program instruction, and when the computer program instruction is executed by the processor, the processor executes the steps of the image recognition methods according to various embodiments of the present application as described in the "Exemplary Method" section of the present specification.

The computer program product may write a program code for performing the operations in the embodiments of the present application in any combination of one or more programming languages. The programming languages include object-oriented programming languages such as Java and C++, as well as conventional procedural programming languages such as "C" language and other similar programming languages. The program code may be executed completely on a user's computing device, partially on a user device, as an independent software package, partially on a user's computing device and partially on a remote computing device, or completely on the remote computing device or a server.

Additionally, the embodiments of the present application may also be a computer readable storage medium storing a computer program instruction, when the computer program instruction is executed by the processor, the processor executes the steps of the image recognition methods according to various embodiments of the present application as described in the "Exemplary Method" section of the present specification.

The computer readable storage media may adopt any combination of one or more readable medium. The readable medium may be a readable signal medium or a readable storage medium. For example, the readable storage medium may include, but not limited to, electrical, magnetic, optical, electromagnetic, infrared or systems, apparatuses or components of a semiconductor, or any combination thereof. More specific examples (a non-exhaustive list) of the readable storage medium include an electrical connection having one or more wires, a portable disk, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof.

Although the basic principles of the present application have been described above in accordance with specific embodiments, it is to be noted that the merits, advantages, effects and the like mentioned in the present application are merely exemplary rather than limiting, and these merits, advantages, effects and the like shall not be considered as necessary to various embodiments of the present application. Additionally, the specific details disclosed above are merely for illustrations and for ease of understanding, rather than limiting. The present application is not limited to be implemented by the above specific details.

The block diagrams of the components, apparatuses, devices and systems involved in the present application are merely illustrative examples and not intended to require or imply that the components, apparatuses, devices and systems must be connected, arranged or configured in the manner shown in the block diagrams. It will be appreciated by those skilled in the art that these components, apparatuses, devices and systems may be connected, arranged or configured in any manner. The words such as "comprise", "include" and "have" are inclusive, meaning "including but not limited to", and may be used interchangeably with "including but not limited to". As used herein, the words such as "or" and "and" mean "and/or" and may be used interchangeably with "and/or", unless otherwise explicitly indicated in the context. As used herein, the word "such as" means "such as, but not limited to", and may be used interchangeably with "such as, but not limited to".

It is to be noted that, in the devices, apparatuses and methods of the present application, the parts or steps may be decomposed and/or recombined. These decompositions and/or re-combinations shall be regarded as equivalent solutions of the present application.

The foregoing description of the disclosed aspects is provided to enable any person skilled in the art to implement or use the present application. Various modifications to these aspects are readily apparent to those skilled in the art, and the general principles defined herein may be applied to other aspects without departing from the scope of the present application. Therefore, the present application is not limited to the aspects shown herein, and follows the broadest scope consistent with the principles and novel features disclosed herein.

The foregoing description has been given for purposes of illustration and description. Additionally, the description is not intended to limit the embodiments of the present application to the forms disclosed herein. Although a number of exemplary aspects and embodiments have been discussed above, those skilled in the art will conceive some variations, modifications, alternations, additions and sub-combinations.

What is claimed is:

1. An image recognition method, comprising:
 determining a type of a current frame image;
 determining a first feature map of the current frame image used to participate in feature alignment and fusion by using a convolutional neural network based on the type of the current frame image;
 determining a second feature map of a key frame image before the current frame image;
 performing feature alignment on the first feature map and the second feature map to obtain a first aligned feature map;
 fusing the first feature map and the first aligned feature map to obtain a first fused feature map; and
 recognizing content in the current frame image based on the first fused feature map.

2. The method according to claim 1, wherein the determining a first feature map of the current frame image used to participate in feature alignment and fusion by using a convolutional neural network based on the type of the current frame image comprises:
 if the type of the current frame image is a key frame image, determining a first low-level feature map of the current frame image based on a convolutional layer with a first preset number of layers in the convolutional neural network;
 determining a first high-level feature map of the current frame image based on a convolutional layer with a second preset number of layers in the convolutional neural network, the first preset number of layers being less than the second preset number of layers; and
 determining the first feature map of the current frame image used to participate in feature fusion based on the first low-level feature map and the second high-level feature map.

3. The method according to claim 1, wherein the determining a second feature map of a key frame image before the current frame image comprises:
 if the type of the current frame image is a key frame image, determining a second low-level feature map of a previous key frame image before the current frame image by using a convolutional layer with a first preset number of layers in the convolutional neural network;
 determining a second high-level feature map of the previous key frame image before the current frame image by using a convolutional layer with a second preset number of layers in the convolutional neural network; and
 determining the second feature map by using the second low-level feature map and the second high-level feature map.

4. The method according to claim 1, further comprising:
 storing a second feature map of a previous key frame image before the current frame image into a cache, the second feature map of the previous key frame image before the current frame image being determined based on a second low-level feature map and a second high-level feature map of the previous key frame image before the current frame image,
 wherein the determining a second feature map of a key frame image before the current frame image comprises:
 if the type of the current frame image is a key frame image, reading the second feature map of the previous key frame image before the current frame image from the cache.

5. The method according to claim 1, wherein the determining a first feature map of the current frame image used to participate in feature alignment and fusion by using a convolutional neural network based on the type of the current frame image comprises:
 if the type of the current frame image is a non-key frame image, determining a third low-level feature map of the current frame image based on a convolutional layer with a first preset number of layers in the convolutional neural network;
 performing spatial transformation on the third low-level feature map by using a spatial transformation network to obtain a first transformed feature map; and
 determining the first feature map based on the first transformed feature map.

6. The method according to claim 1, wherein the determining a second feature map of a key frame image before the current frame image comprises:
 if the type of the current frame image is a non-key frame image, determining a third feature map of a previous key frame image before the current frame image used to participate in feature fusion;
 determining a fourth feature map of the previous two key frame image before the current frame image used to participate in feature fusion; and
 determining the second feature map by using the third feature map and the fourth feature map.

7. The method according to claim 1, further comprising:
 storing a second feature map of a previous key frame image before the current frame image into a cache, the second feature map of the previous key frame image before the current frame image being determined based on a third feature map of the previous key frame image before the current frame image used to participate in feature fusion and a fourth feature map of a previous two key frame image before the current frame image used to participate in feature fusion, wherein the determining a second feature map of a key frame image before the current frame image comprises:

if the current frame image is a non-key frame image, reading the second feature map of the previous key frame image before the current frame image from the cache.

8. The method according to claim 1, wherein the performing feature alignment on the first feature map and the second feature map to obtain a first aligned feature map comprises:

performing the feature alignment on each feature point of the first feature map in a corresponding region in the second feature map to obtain the first aligned feature map.

9. The method according to claim 8, wherein the performing the feature alignment on each feature point of the first feature map in a corresponding region in the second feature map to obtain the first aligned feature map specifically comprises:

determining the corresponding region in the second feature map for each feature point of the first feature map;

performing feature similarity-matching on each feature point of the first feature map in the corresponding region in the second feature map by using a progressive sparse step size to determine an aligned feature point in the corresponding region in the second feature map for each feature point of the first feature map; and obtaining the first aligned feature map according to the aligned feature point in the corresponding region in the second feature map for each feature point in the first feature map.

10. The method according to claim 1, wherein the determining the type of the current frame image comprises:

if a point in time corresponding to the current frame image is within a first preset time period, determining the type of the current frame image based on a first key frame setting condition corresponding to the first preset time period; and if the point in time corresponding to the current frame image is within a second preset time period, determining the type of the current frame image based on a second key frame setting condition corresponding to the second preset time period, the first preset time period being not overlapped with the second preset time period.

11. A non-transitory computer readable storage medium on which a computer program is stored, wherein the computer program is configured to control a processor to execute the following steps:

determining a type of a current frame image;

determining a first feature map of the current frame image used to participate in feature alignment and fusion by using a convolutional neural network based on the type of the current frame image;

determining a second feature map of a key frame image before the current frame image;

performing feature alignment on the first feature map and the second feature map to obtain a first aligned feature map;

fusing the first feature map and the first aligned feature map to obtain a first fused feature map; and recognizing content in the current frame image based on the first fused feature map.

12. An electronic apparatus, comprising:

a processor; and a memory, configured to store an executable instruction executed by the processor, wherein when the executable instruction is executed by the processor, the processor performs the following steps:

determining a type of a current frame image;

determining a first feature map of the current frame image used to participate in feature alignment and fusion by using a convolutional neural network based on the type of the current frame image;

determining a second feature map of a key frame image before the current frame image;

performing feature alignment on the first feature map and the second feature map to obtain a first aligned feature map;

fusing the first feature map and the first aligned feature map to obtain a first fused feature map; and recognizing content in the current frame image based on the first fused feature map.

13. The electronic apparatus according to claim 12, wherein the determining a first feature map of the current frame image used to participate in feature alignment and fusion by using a convolutional neural network based on the type of the current frame image comprises:

if the type of the current frame image is a key frame image, determining a first low-level feature map of the current frame image based on a convolutional layer with a first preset number of layers in the convolutional neural network;

determining a first high-level feature map of the current frame image based on a convolutional layer with a second preset number of layers in the convolutional neural network, the first preset number of layers being less than the second preset number of layers; and determining the first feature map of the current frame image used to participate in feature fusion based on the first low-level feature map and the second high-level feature map.

14. The electronic apparatus according to claim 12, wherein the determining a second feature map of a key frame image before the current frame image comprises:

if the type of the current frame image is a key frame image, determining a second low-level feature map of a previous key frame image before the current frame image by using a convolutional layer with a first preset number of layers in the convolutional neural network;

determining a second high-level feature map of the previous key frame image before the current frame image by using a convolutional layer with a second preset number of layers in the convolutional neural network; and determining the second feature map by using the second low-level feature map and the second high-level feature map.

15. The electronic apparatus according to claim 12, wherein the processor further performs the following step:

storing a second feature map of a previous key frame image before the current frame image into a cache, the second feature map of the previous key frame image before the current frame image being determined based on a second low-level feature map and a second high-level feature map of the previous key frame image before the current frame image, wherein the determining a second feature map of a key frame image before the current frame image comprises:

if the type of the current frame image is a key frame image, reading the second feature map of the previous key frame image before the current frame image from the cache.

16. The electronic apparatus according to claim 12, wherein the determining a first feature map of the current frame image used to participate in feature alignment and fusion by using a convolutional neural network based on the type of the current frame image comprises:
- if the type of the current frame image is a non-key frame image, determining a third low-level feature map of the current frame image based on a convolutional layer with a first preset number of layers in the convolutional neural network;
- performing spatial transformation on the third low-level feature map by using a spatial transformation network to obtain a first transformed feature map; and
- determining the first feature map based on the first transformed feature map.

17. The electronic apparatus according to claim 12, wherein the processor further performs the following step:
- storing a second feature map of a previous key frame image before the current frame image into a cache, the second feature map of the previous key frame image before the current frame image being determined based on a third feature map of the previous key frame image before the current frame image used to participate in feature fusion and a fourth feature map of a previous two key frame image before the current frame image used to participate in feature fusion,
- wherein the determining a second feature map of a key frame image before the current frame image comprises:
- if the current frame image is a non-key frame image, reading the second feature map of the previous key frame image before the current frame image from the cache.

18. The electronic apparatus according to claim 12, wherein the performing feature alignment on the first feature map and the second feature map to obtain a first aligned feature map comprises:
- performing the feature alignment on each feature point of the first feature map in a corresponding region in the second feature map to obtain the first aligned feature map.

19. The electronic apparatus according to claim 18, wherein the performing the feature alignment on each feature point of the first feature map in a corresponding region in the second feature map to obtain the first aligned feature map specifically comprises:
- determining the corresponding region in the second feature map for each feature point of the first feature map;
- performing feature similarity-matching on each feature point of the first feature map in the corresponding region in the second feature map by using a progressive sparse step size to determine an aligned feature point in the corresponding region in the second feature map for each feature point of the first feature map; and
- obtaining the first aligned feature map according to the aligned feature point in the corresponding region in the second feature map for each feature point in the first feature map.

20. The electronic apparatus according to claim 12, wherein the determining the type of the current frame image comprises:
- if a point in time corresponding to the current frame image is within a first preset time period, determining the type of the current frame image based on a first key frame setting condition corresponding to the first preset time period; and
- if the point in time corresponding to the current frame image is within a second preset time period, determining the type of the current frame image based on a second key frame setting condition corresponding to the second preset time period, the first preset time period being not overlapped with the second preset time period.

* * * * *